United States Patent [19]

Messick et al.

[11] 4,315,525
[45] Feb. 16, 1982

[54] MIXING VALVE

[75] Inventors: Walker Messick; Gerald E. Christiansen, both of Flora, Ind.

[73] Assignee: Stephen A. Young Corporation, Flora, Ind.

[21] Appl. No.: 218,783

[22] Filed: Dec. 22, 1980

[51] Int. Cl.³ .............................................. F16K 7/12
[52] U.S. Cl. ................................................ 137/625.4
[58] Field of Search ........................ 137/625.4, 625.41

[56] References Cited

U.S. PATENT DOCUMENTS 3,472,279 10/1969 Sanderson ...................... 137/625.41
3,519,017 7/1970 Nogier .............................. 137/625.4
3,747,641 7/1973 Hare ................................ 137/625.41

Primary Examiner—Robert G. Nilson
Attorney, Agent, or Firm—Olsen and Stephenson

[57] ABSTRACT

A single lever mixing valve adapted for proportioning hot and cold water and for controlling the volume of flow. A valve body has fluid passages which terminate in two spaced apart inlet ports and an outlet port to a valve seat. A generally spherical closure member is universally movable within the valve body so as to normally cover and seal the inlet ports in a closed position. Two recesses in the surface of the closure member are spaced apart by a divider portion and extend circumferentially relative to the inlet ports. Due to this configuration, the closure member can be moved to open mixing positions in which each recess completes a fluid passage between one of the inlet ports and the outlet port. The divider portion can be positioned to partially or fully close one inlet port while the other inlet port remains open.

6 Claims, 5 Drawing Figures

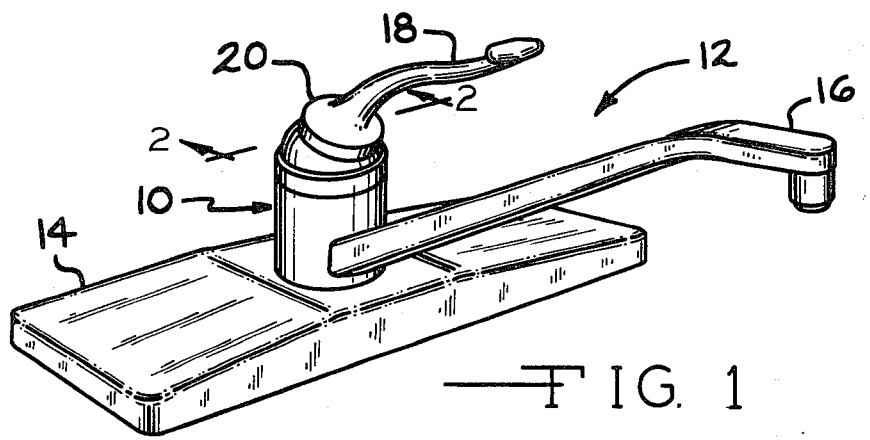
FIG. 1
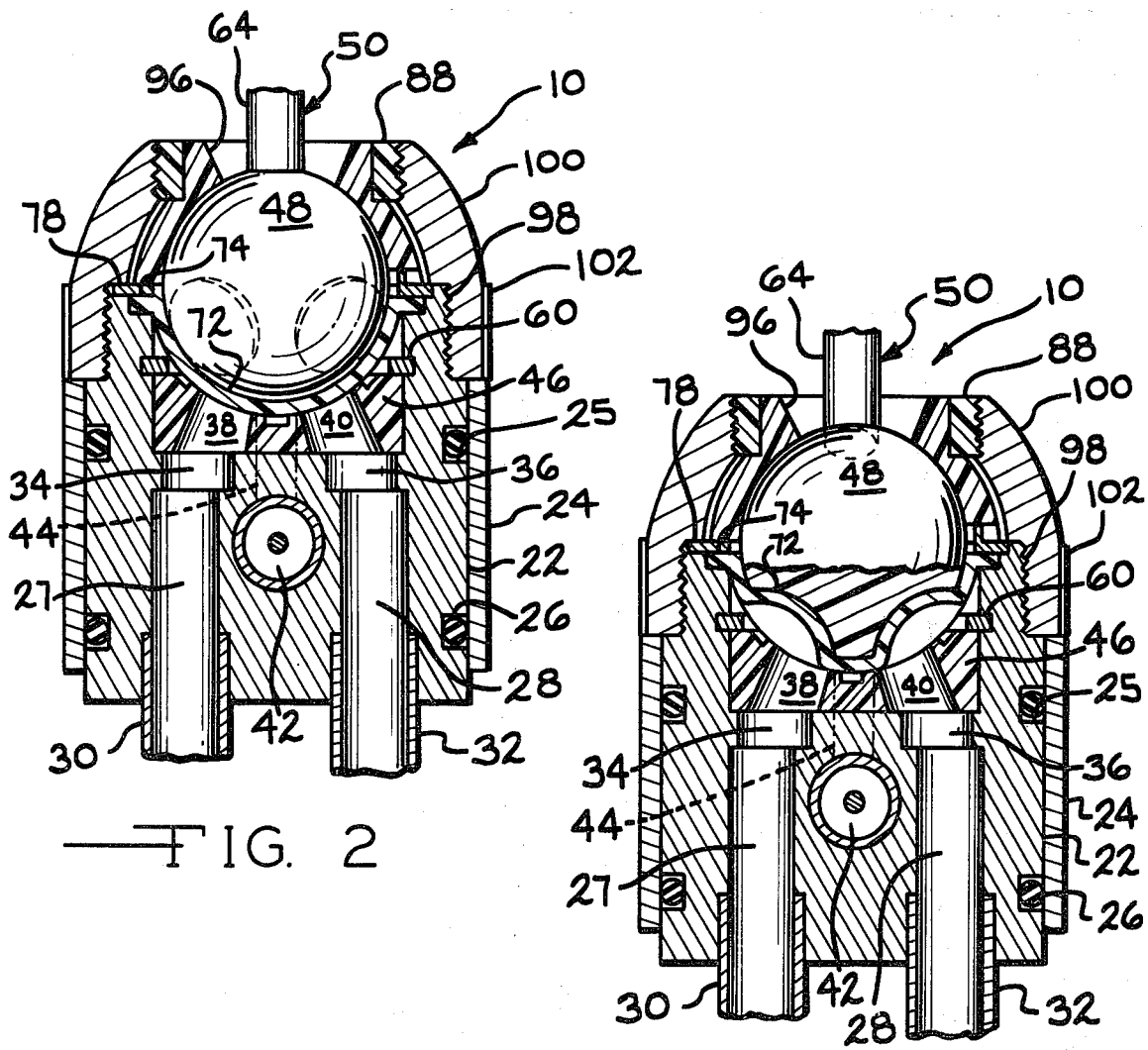
FIG. 2
FIG. 3

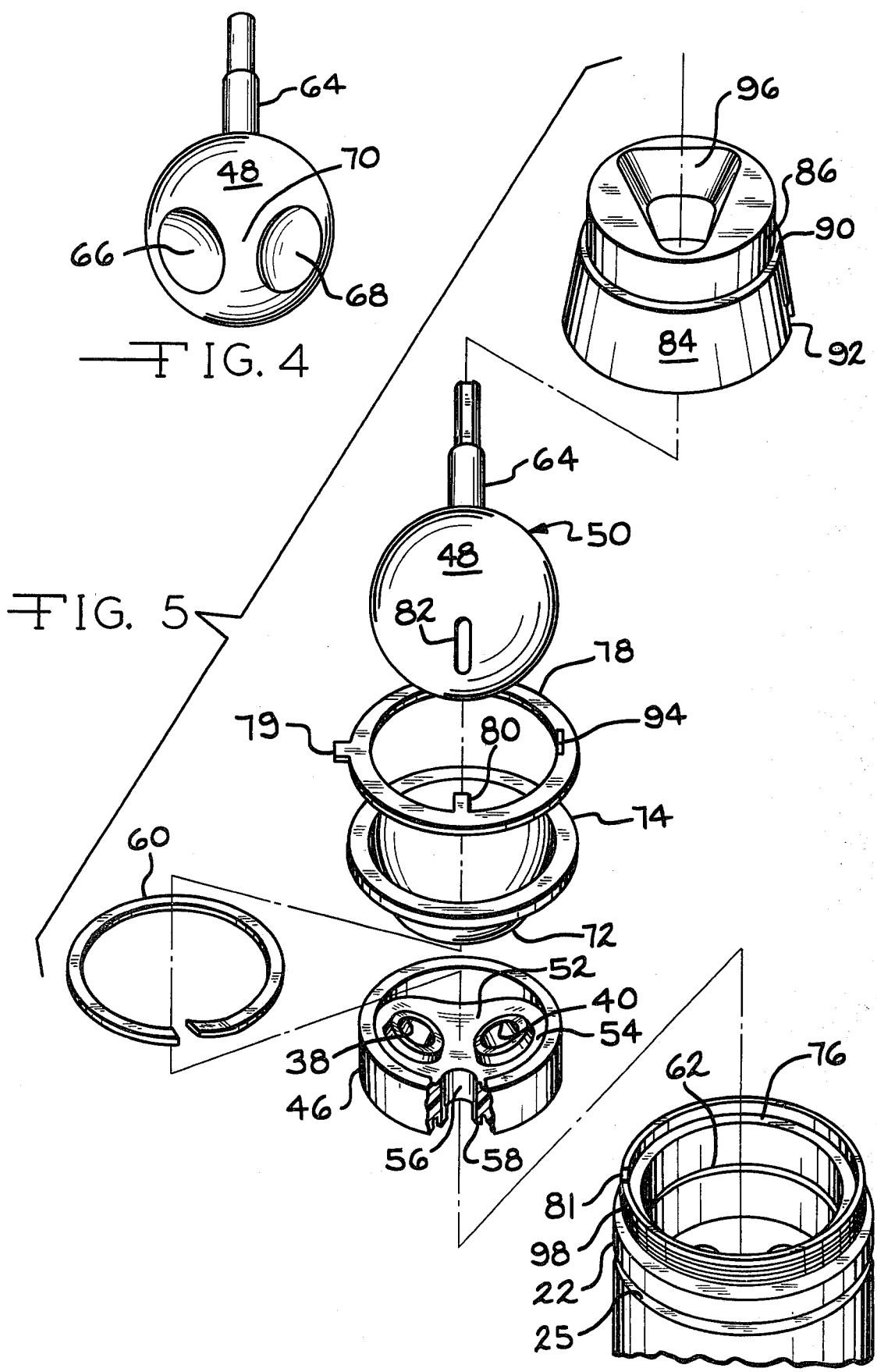

MIXING VALVE

BACKGROUND OF THE INVENTION

1. Field of the Invention

The present invention relates to a mixing or proportioning valve and, more particularly, to a ball-type single lever valve adapted for mixing or proportioning hot and cold water and for controlling the volume of flow.

2. Description of the Prior Art

Many mixing devices have been developed to avoid the disadvantages of utilizing separate hot and cold water taps to control water temperature and volume. These devices permit the simultaneous setting of the volume of water delivered as well as the proportion of hot and cold water, and they can be provided with predetermined markings to indicate the approximate volume of flow and proportion of hot and cold water. Various refinements have been added, including the addition of liner members and flexible diaphrams to improve the sealing between the valve elements and to extend the operating life of the mixing valve.

One problem inherent in the prior art devices is the reversed operation of the valve relative to traditional hot and cold water taps. Since the inlet passages enter the mixing valve from below and since the hand control lever conveniently extends from the top of the mixing valve, movement of the hand control lever toward the hot water inlet pipe results in an increased proportion of cold water flow. U.S. Pat. Nos. 3,519,017; 3,809,124; and 4,182,372 issued to Nogier et al, Nelson, and Grandin, Jr. et al, respectively, are typical of this reversed operation. Other problems of the existing mixing valve devices include excessive noise resulting from turbulence within the mixing valve and high manufacturing costs associated with the shape of the water passages and the valve seat construction. Such difficulties are illustrated by U.S. Pat. Nos. 3,056,418 and 3,422,849 issued to Adams et al and Manoogian, respectively.

Accordingly, it is an object of the present invention to provide an improved ball-type single lever mixing valve which does not have a reversed mode of operation. It is a further object of the present invention to provide an improved ball-type single lever mixing valve which has reduced noise associated with water turbulence and which can be economically manufactured.

SUMMARY OF THE INVENTION

The present invention is a mixing valve which comprises a body, a closure member, and a means for moving the closure member between closed and open positions. The body has two inlet passages and an outlet duct which terminate in two spaced apart inlet ports and an outlet port to a valve seat. The closure member is generally spherical and is universally movable within the body so as to normally cover and seal the inlet ports and prevent flow from the inlet ports to the outlet port in a closed position.

The closure member has two recesses which are spaced apart by a divider portion such that the closure member can be moved to an open mixing position in which each recess overlies one of the inlet ports and extends circumferentially beyond that inlet port in a direction away from the other inlet port. As a result of this configuration, the divider portion of the closure member can be moved to progressively overlie and close one of the inlet ports while the other inlet port remains substantially open. The mixing valve of the present invention can be fitted with a flexible diaphragm to enhance sealing and can include a mixing cavity to assist in blending the outlet flow. The recesses of the closure member may be flat or concave, and the means for moving the closure member may be a hand lever fixed to a central stem.

As a result of the present invention, the convenience of a single lever ball-type valve adapted for controlling the volume of flow as well as for proportioning the mixture of hot and cold water can be realized without the disadvantages of the prior art. The operation of the hand control lever is not reversed with respect to the location of the hot and cold water inlet passages as conventionally installed. Additionally, the mixing valve of the present invention results in reduced turbulence and noise and can be manufactured economically.

Further objects, features, and advantages of the present invention will become apparent from a consideration of the following description, the appended claims and the accompanying drawings.

BRIEF DESCRIPTION OF THE DRAWINGS

FIG. 1 is a perspective view of a water tap assembly which has been fitted with the mixing valve of the present invention;

FIG. 2 is a sectional view of the mixing valve of FIG. 1 along the line 2—2 of FIG. 1 showing the closure member in the closed position;

FIG. 3 is a sectional view of the mixing valve like FIG. 2 but with the closure member in an open mixing position;

FIG. 4 is a perspective view of the closure member of the mixing valve of this invention; and FIG. 5 is an exploded view of the mixing valve of the present invention.

DESCRIPTION OF THE PREFERRED EMBODIMENT

With reference to the drawing, the mixing valve of the present invention, indicated generally at 10, is illustrated in FIG. 1 in operating relation to a water tap assembly, generally indicated at 12. The water tap assembly 12 includes a base 14 which is mountable to a substantially horizontal surface adjacent a sink or lavatory, not shown, and a spout 16 which directs the water flow into the sink or lavatory. A hand control lever 18 is fixed to the mixing valve 10 as discussed below and extends generally upward and outward from the mixing valve 10 for convenient manual operation. A flared base 20 has a spherically concave lower portion adapted to slidably receive the upper end of the mixing valve 10 so as to serve as a cover.

Referring now to FIGS. 2-4, the mixing valve 10 has a substantially cylindrical body portion 22 having a concentric outer shell or casing 24 rotatably mounted thereon. A pair of spaced apart annular grooves 25 are formed in the body portion 22 to receive O-rings 26 so as to support the outer casing 24 and provide a fluid-tight seal. As is conventional, a circumferentially extending groove or cavity, not shown, of substantial axial length is provided between the body portion 22 and the outer casing 24. This circumferential groove or cavity defines an annular passageway to the spout 16, which is mounted over and in fluid communication therewith. It will be noted that water or other fluid can be drawn from the annular passageway while the spout 16 and outer casing 24 are rotated through a substantial angular displacement relative to the body portion 22.

The lower end of the body portion 22 is provided with a pair of cylindrical passages 27 and 28 that extend generally axially through the body portion 22 and are adapted at their lower ends to receive a hot water inlet pipe 30 and a cold water inlet pipe 32, respectively. At their upper ends, the pair of inlet passages 27 and 28 are offset radially inward by means of cylindrical passage portions 34 and 36 so as to better communicate with hot and cold water inlet ports 38 and 40, discussed below. Applicant has found that the stepwise offsetting of the passage portions 34 and 36 results in a substantial manufacturing cost savings with respect to a more conventional angular boring of the inlet passages. A radially extending outlet passage 42, which is positioned between the inlet passages 26 and 28, receives fluid from a longitudinal outlet duct 44 and directs the fluid into the annular fluid passage between the body portion 22 and outer casing 24 previously described.

The inlet ports 38 and 40 are formed within a substantially cylindrical valve seat unit 46 which fits within a complementary cylindrical cavity concentrically formed within the upper end of the body portion 22. The upper surface of the valve seat unit 46 has a modified spherical cavity adapted to receive a spherical ball 48 of the closure member, generally indicated 50. The inlet ports 38 and 40 angle radially with respect to the spherical ball 48 and terminate adjacent the surface of the closure member 50. A concave portion 52 of the valve seat unit 46 includes fluid channels 54 surrounding the terminus of each inlet port to provide a passage to an outlet port 56 which is also formed within the valve seat unit 46. The valve seat unit 46 is maintained in proper angular alignment with respect to the inlet and outlet ports by means of an extension 58 adjacent the outlet port 56. The valve seat unit 46 is secured longitudinally by means of a split retaining ring 60 which expands to engage a complementary annular channel 62 in the cylindrical cavity of the upper end of the body portion 22.

The closure member 50 includes an upwardly extending stem to facilitate the universal movement of the spherical ball 26 upon which it is mounted. In the preferred embodiment, the stem includes a stepdown shaft with a flat adapted to provide a conventional set screw mounting for the hand control lever 18. The spherical ball 48 includes two generally oval shaped recesses 66 and 68 which may be flat or concave. The recesses 66 and 68 are symmetrically positioned with respect to a divider portion 70 of the spherical ball 48 by which the recesses are spaced apart.

The closure member is universally movable between a closed position in which the spherical portion of the spherical ball 48 overlies and seals the inlet ports 38 and 40 as shown in FIG. 2 and an open mixing position in which the recesses 66 and 68 overlie and open the inlet ports 38 and 40. The recesses 66 and 68 each have a larger area than that of the respective inlet port and extend circumferentially away from the divider portion 70 of the spherical ball 48. This extended area of the recesses 66 and 68 permits movement of the closure member to various open positions in which the divider portion 70 progressively overlies and closes one of the inlet ports while the second inlet port remains substantially open due to fluid communication between the second inlet port and the fluid channel 54 along its perimeter.

In order to facilitate sealing of the hot and cold inlet ports 38 and 40, a hemispherical flexible diaphram 72, is positioned between the valve seat unit 46 and the spherical ball 48. The flexible diaphram 72 conforms to the spherical ball 48, has a substantially uniform thickness, and includes an outwardly extending flange 74 which is positioned against a complementary internal shoulder 76 at the upper end of the body portion 22. As shown in FIG. 3, the flexible diaphram 72 resiliently deforms into the recesses 66 and 68 in response to fluid pressure within the inlet passages 27 and 28 so as to provide a fluid passage between the inlet ports 38 and 40 and the outlet port 56. A retaining washer 78 maintains the flexible diaphram 72 in position against the body portion 22 to provide a seal preventing upward fluid flow. The retaining washer 78 includes an outwardly extending tab 79 and an inwardly extending tab 80 which engage an alignment notch 81 of the body portion 22 and an alignment slot 82 in the surface of the spherical ball 48, respectively, to prevent twisting of the hand control lever 18 about a vertical axis.

A control collar 84 having a spherically concave lower surface substantially conforming to the surface of the spherical ball 48 is adapted to slidably engage the spherical ball 48. The upper end of the control collar 84 is formed with a cylindrical flange 86 which is adapted to slidably receive an annular adjustment ring 88 which abuts against a shoulder 90 to bias the control collar 84 downward against the flexible diaphram 72 and the valve seat unit 46. An alignment notch 92 in the lower end of the control collar 84 engages an upwardly extending tab 94 of the retaining washer 78 to prevent rotation of the control collar 84 with respect to the body portion 22. A generally triangular or heart-shaped opening 96 is formed in the upper end of the control collar 84 to serve as a guide for the stem 64 so as to restrict the movement of the universally movable closure member 50 relative to the inlet ports 38 and 40.

The upper end of the body portion 22 has external threads 98 to threadably engage a cap 100 which overlies the control collar 84 and has a spherically convex configuration adapted for sliding movement with respect to the flared base 20 of the hand control lever 18. The upper end of the cap 100 is internally threaded to receive the annular adjustment ring 88. It will be noted that the adjustment ring 88 may be threadably advanced against the shoulder 90 of the control collar 84 to force the retaining washer 78 and spherical ball 48 against the flexible diaphram 72 and the valve seat unit 46 to provide proper sealing of those elements and compensate for wear of the flexible diaphram 72. The cylindrical outer casing 24 extends upward as a decorative cover 102 over the lower portion of the cap 100 to enhance the assembled appearance of the water tap assembly 12. The mixing valve 10 may be mounted upon the water tap base 14 by any conventional means.

It will be seen from the foregoing description of the preferred embodiment that the present invention provides an improved ball-type single lever mixing valve which does not have a reversed mode of operation. Further, the improved mixing valve of the present invention has low noise associated with water turbulence and has relatively low manufacturing costs. While the preferred embodiment has been described in considerable detail, the present invention is not to be limited to such detail except as may be necessitated by the appended claims.

What is claimed is:

1. A mixing valve comprising:

a body having two inlet passages, an outlet duct and a valve cavity including a valve seat disposed therein with the outlet duct and the inlet passages terminating in an outlet port and two spaced inlet ports to said valve seat, a generally spherical closure member universally pivotable within said body so as to normally cover and seal said inlet ports and prevent flow from said inlet ports to said outlet port in a closed position, said closure member having two recesses spaced apart by a divider portion such that upon movement of said closure member to an open mixing position each of said recesses permits fluid communication between one of said inlet ports and said outlet port to open both inlet ports, each of said recesses in said open mixing position overlying one of said inlet ports and extending circumferentially beyond said inlet port in a direction away from the other of said inlet ports such that upon movement of said divider portion to progressively overly and close one of said inlet ports the other of said inlet ports remains substantially open, means for moving said closure member between said closed position and said open mixing position and to control the mixture of the fluids from the two inlet ports by moving said closure member to other open positions; and a flexible diaphram fitted between said valve seat and said closure member so as to enhance sealing between said closure member and said inlet and outlet ports, said diaphram being resiliently deformable into said recesses in response to pressure of fluid in said inlet passages when said closure member is moved to said open positions.

2. A mixing valve as defined in claim 1 wherein said valve cavity further comprises a mixing cavity in fluid communication with said outlet duct to mix the fluids from said two inlet ports when said closure member is in said open positions.

3. A mixing valve as defined in claim 2 wherein said valve seat is generally spherical and said mixing cavity includes a channel in said valve seat along at least part of the perimeter of said inlet ports, said recesses overlying a portion of said channel in said open positions.

4. A mixing valve as defined in claim 1 wherein said recesses are concave.

5. A mixing valve as defined in claim 1 wherein said means for moving said closure member includes a stem fixed to said closure member and a hand lever fixed to said stem.

6. A mixing valve as defined in claim 5 which further comprises means on said body operable to prevent rotation of said closure member relative to said body about an axis coincident with a diameter of said closure member substantially in alignment with said stem.

* * * * *